(12) United States Patent
Schneider

(10) Patent No.: US 8,495,507 B2
(45) Date of Patent: Jul. 23, 2013

(54) TOPIC BASED GUIDANCE FOR ELECTRONIC COMMUNICATIONS

(75) Inventor: Scott Edward Schneider, Rolesville, NC (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/499,941

(22) Filed: Jul. 9, 2009

(65) Prior Publication Data
US 2011/0010637 A1    Jan. 13, 2011

(51) Int. Cl.
*G06F 3/00* (2006.01)
(52) U.S. Cl.
USPC ............... 715/758; 715/752; 715/753
(58) Field of Classification Search
USPC .......................... 715/752–753, 758
See application file for complete search history.

(56) References Cited

U.S. PATENT DOCUMENTS

| | | | |
|---|---|---|---|
| 6,907,447 B1 | 6/2005 | Cooperman et al. | |
| 6,938,213 B2* | 8/2005 | Brown et al. | 715/758 |
| 7,240,093 B1* | 7/2007 | Danieli et al. | 715/733 |
| 7,281,215 B1 | 10/2007 | Canfield et al. | |
| 2010/0205541 A1* | 8/2010 | Rapaport et al. | 715/753 |
| 2012/0030301 A1* | 2/2012 | Herold et al. | 709/206 |

* cited by examiner

*Primary Examiner* — Weilun Lo
*Assistant Examiner* — Truc Chuong
(74) *Attorney, Agent, or Firm* — DeLizio Gilliam, PLLC

(57) ABSTRACT

Electronic communication systems can be enhanced to allow a sender to indicate a topic and request an amount time for a conversation. The topic and time requested can be displayed to a recipient along with the sender's identification so that the recipient can choose to accept or reject the conversation. If the conversation is accepted, the topic and an amount of time remaining can be displayed to both the sender and the recipient. In addition, the sender and the recipient can be reminded of the topic if the discussions are off-topic.

12 Claims, 5 Drawing Sheets

TOPIC BASED GUIDANCE FOR ELECTRONIC COMMUNICATIONS

BACKGROUND

Embodiments of the inventive subject matter generally relate to the field of electronic communications, and more particularly to topic based guidance for electronic communications.

Electronic communications (e.g., phone calls, instant messages, etc.) allow users to be reached at any time. Sometimes, recipients of electronic communications are busy and may only wish to be disturbed for important conversations. A sender's identity is announced to a recipient via Caller Identification ("Caller ID") or other similar features. Caller ID allows the recipient to screen incoming electronic communications based on the identity of the recipient. The recipient can accept important electronic communications (e.g., from the recipient's boss) or ignore other electronic communications that may be less important (e.g., from the recipient's mother).

SUMMARY

Embodiments include a method directed to determining that topic based screening is enabled for a recipient of a request for an electronic conversation. In some embodiments, a topic for the electronic conversation can be determined. The topic can be displayed to the recipient. If the recipient accepts the topic, the electronic conversation can be started between the recipient and a sender. If the at least one of the recipient and the sender strays from the topic, the recipient and sender can be reminded of the topic.

BRIEF DESCRIPTION OF THE DRAWINGS

The present embodiments may be better understood, and numerous objects, features, and advantages made apparent to those skilled in the art by referencing the accompanying drawings.

FIG. 3 depicts a flowchart of example operations for topic based guidance of electronic communications.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to instant messaging applications, embodiments may be implemented in landline telephone networks, mobile telephone networks, Voice over Internet Protocol (VoIP) networks, etc. In other instances, well-known instruction instances, protocols, structures, and techniques have not been shown in detail in order not to obfuscate the description.

Announcement of senders' identities assists recipients in determining whether electronic communications are important before accepting the communications. Basing a decision to ignore an electronic communication on a sender's identity can cause a recipient to miss an important conversation. For example, a recipient receives a phone call from the recipient's mother who routinely calls to chat, so the recipient decides to ignore the call. However, the recipient's mother called to inform the recipient of an emergency. In addition, recipients may be able to spare a few minutes to discuss important issues even though the recipients do not want to engage in long conversations. A recipient may not be able to anticipate how long a conversation may last based on a sender's identity. According to some embodiments, electronic communication systems can be enhanced to allow a sender to indicate a topic and request an amount time for a conversation. The topic and time requested can be displayed to a recipient along with the sender's identification, so that the recipient can choose to accept or reject the conversation. If the conversation is accepted, the topic and an amount of time remaining can be displayed to both the sender and the recipient. In addition, the system can remind the sender and recipient of the topic if the discussions are off-topic.

Figure 1:
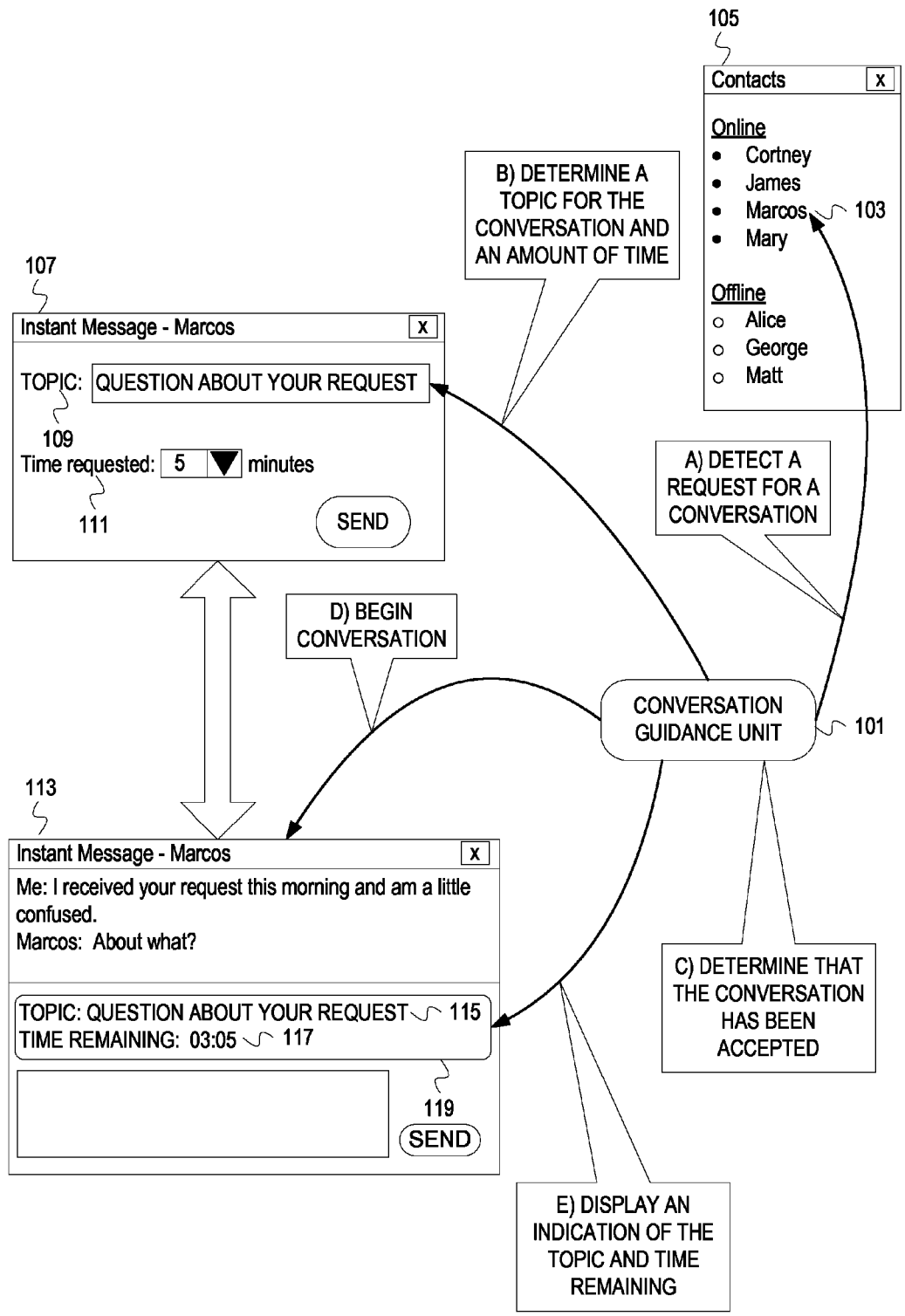
FIG. 1 is an example conceptual diagram of topic based guidance for electronic communications.

FIG. 1 is an example conceptual diagram of topic based guidance for electronic communications. FIG. 1 shows dataflow and operations occurring in stages A-E. At stage A, a conversation guidance unit 101 detects a request for a conversation. In this example, the conversation guidance unit 101 detects selection of an instant messaging contact 103 in an instant messaging contact list 105.

At stage B, the conversation guidance unit 101 determines a topic and an amount of time for the conversation. In this example, the conversation guidance unit 101 determines the topic and amount of time based on a sender's indication in a "topic" text box 109 and a "time requested" drop down box 111 of an instant message window 107. The topic text box 109 allows the sender to specify any subject the sender wishes. In other examples, the topic may be chosen from a list of topics. The instant messaging contact 103 and/or the instant messaging contact's 103 company can specify the list of topics and the list of topics may be stored in the instant messaging contact's 103 profile. In addition, the options available in the list may be limited based on the instant messaging contact's 103 status. For example, the instant messaging contact 103 specified three possible topics, "I have a technical question," "Meet for lunch," and "I have an administrative question." When the instant messaging contact's 103 status is "available," all three possible topics can be chosen for the conversation. When the instant messaging contact's 103 is "busy," the possible topics are limited to "I have a technical question." If the possible topics do not include the topic the sender wishes to discuss, the sender may determine that the recipient does not currently wish to discuss the topic. So, the sender may abort the conversation request.

At stage C, the conversation guidance unit 101 determines that the conversation has been accepted. For example, the instant messaging contact 103 clicks an "accept" button in a popup window and the instant messaging contact's 103 instant messaging client returns an indication that the conversation has been accepted to the conversation guidance unit 101.

At stage D, the conversation guidance unit 101 begins the conversation. In this example, the conversation guidance unit opens an instant messaging chat window 113.

At stage E, the conversation guidance unit 101 displays an indication of the topic 115 and time remaining 117. In this example, the topic 115 and time remaining 117 are displayed in a balloon 119 in the instant messaging window 113. Displaying the topic 115 and the time remaining 117 can keep conversation participants from wasting time on off-topic discussions.

Figure 2:
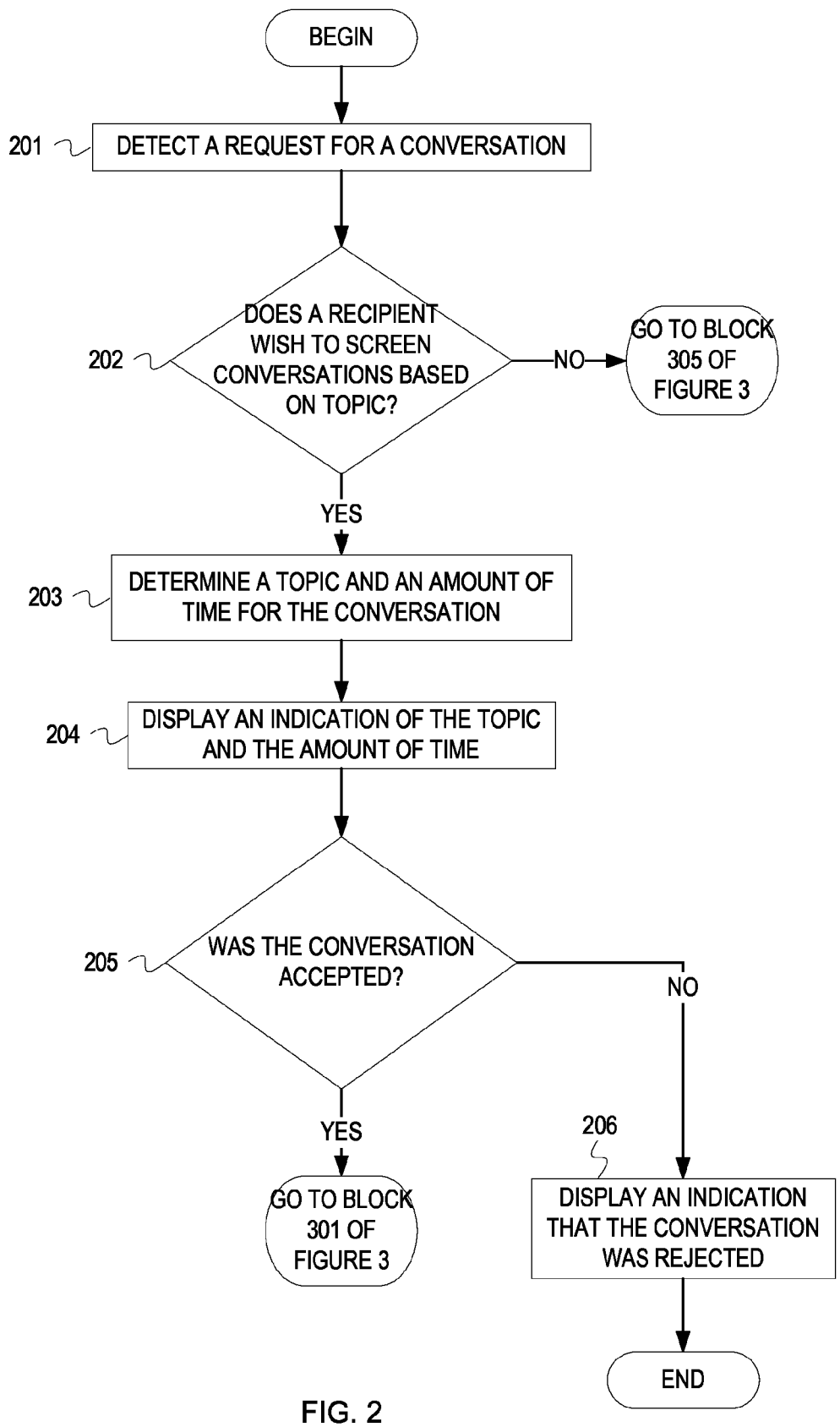
FIGS. 2 and 3 depict a flowchart of example operations for topic based guidance of electronic communications.
Figure 3:
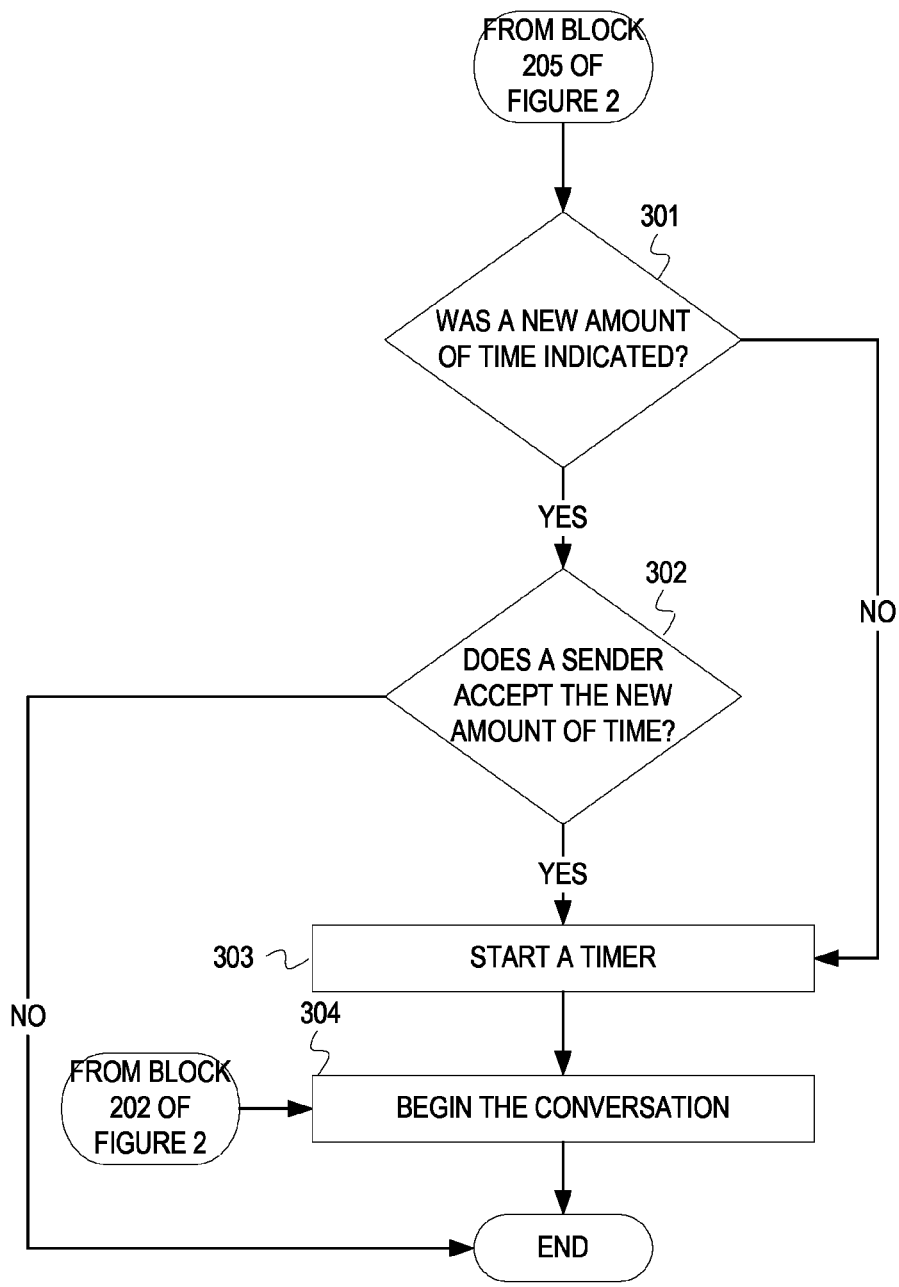

FIGS. 2 and 3 depict a flowchart of example operations for topic based guidance of electronic communications. Flow begins at block 201, where a conversation guidance unit detects a request for a conversation from a caller/sender. For example, the conversation guidance unit detects that a phone number has been dialed. Flow continues at block 202.

At block 202, the conversation guidance unit determines if the recipient wishes to screen conversations based on topic. For example, the conversation guidance unit determines that the recipient wishes to screen conversations based on a profile retrieved from an instant messaging service provider (i.e., the recipient's profile indicates a desire to screen conversations). As another example, the conversation guidance unit determines that the recipient wishes to screen conversations based on a voice prompt requesting a topic (e.g., the recipient provides voice input indicating a desire to screen conversations). If the recipient wishes to screen conversations based on topic, flow continues at block 203. If the recipient does not wish to screen conversations based on topic, flow continues at block 305 of FIG. 3.

At block 203, the conversation guidance unit determines a topic and an amount of time for the conversation. For example, the conversation guidance unit audibly prompts a sender to select the topic from a list by pushing a number on a telephone keypad. The conversation guidance unit also prompts the user to enter the amount of time as a two-digit number represented in minutes using the telephone keypad. As another example, the conversation guidance unit prompts the sender to say the topic after a beep. The conversation guidance unit records the sender's voice for playback to the recipient. Flow continues at block 204.

At block 204, the conversation guidance unit displays an indication of the topic and the amount of time to a recipient. For example, the topic and amount of time are displayed in an instant messaging window. As another example, the conversation guidance unit audibly indicates the topic and amount of time. An identity of the sender may be displayed in addition to the topic and the amount of time. Flow continues at block 205.

At block 205, the conversation guidance unit determines if the conversation was accepted by the recipient. For example, the conversation guidance unit may display the topic and amount of time in a pop-up window to allow the recipient to click an "accept" button or a "reject" button. As another example, the conversation guidance unit may audibly prompt the recipient to press a number on a telephone keypad to accept or reject the conversation. The conversation can be automatically rejected based on preferences and a status of the recipient. For example, the recipient may wish to automatically reject a conversation if the amount of time for the conversation is above a threshold and the recipient's status is busy. If the conversation was accepted, flow continues at block 301 of FIG. 3. If the conversation was rejected, flow continues at block 206.

At block 206, the conversation guidance unit displays an indication that the conversation was rejected to the sender and flow ends. For example, the conversation guidance unit may send to the sender an instant message stating, "The recipient is unavailable right now." As another example, the conversation guidance unit may send a busy signal to the sender's telephone.

FIG. 3 depicts a flowchart of example operations for topic based guidance of electronic communications. Flow continues from block 205 of FIG. 2 at block 301 of FIG. 3, where the conversation guidance unit determines if a new amount of time was indicated by the recipient. For example, the recipient changed the amount of time before clicking an accept button. If a new amount of time was indicated, flow continues at block 302. If a new amount of time was not indicated, flow continues at block 303.

At block 302, the conversation guidance unit determines if the sender accepts the new amount of time. For example, the conversation guidance unit displays the new amount of time and prompts the sender to accept or reject the new amount of time. If the sender accepts the new amount of time, flow continues at block 303. If the sender rejects the new amount of time, flow ends.

At block 303, the conversation guidance unit starts a timer. The timer can countdown starting at the original amount of time or the new amount of time. In addition, a time remaining can be displayed to both the sender and the recipient based on the value of the timer. For example, the time remaining is displayed in a bubble in an instant message window. As another example, the time remaining is audibly announced to both the sender and the recipient at certain time intervals during the conversation. Flow continues at block 304.

At block 304, the conversation guidance unit begins the conversation and flow ends. For example, the conversation guidance unit opens instant message windows for both the sender and the recipient. As another example, the conversation guidance unit connects a voice call.

Figure 4:
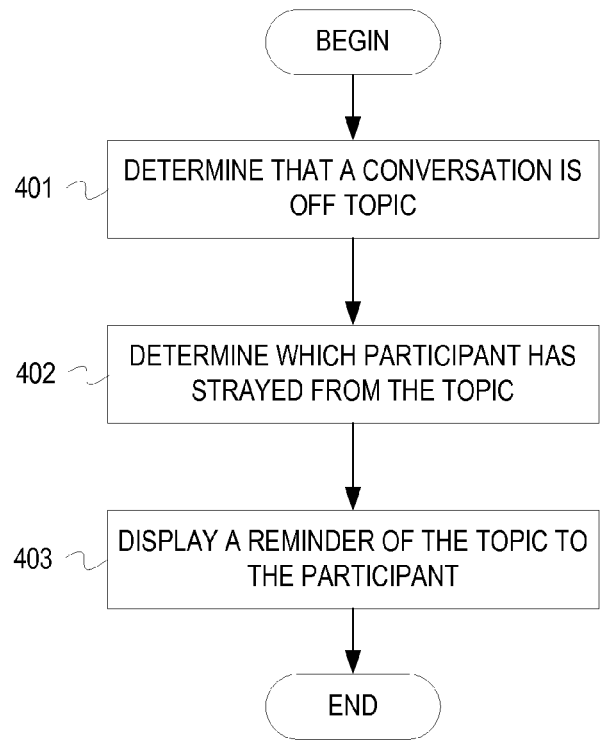
FIG. 4 depicts a flowchart of example operations for automatically reminding participants of conversation topics.

A conversation that strays from an intended topic can be problematic for a participant who has a limited time for the conversation. The participant wants to keep the conversation on topic while not appearing rude. FIG. 4 depicts a flowchart of example operations for automatically reminding participants of conversation topics. Flow begins at block 401, where a conversation guidance unit determines that a conversation is off topic. The conversation guidance unit can automatically determine that the conversation is off topic. For example, the conversation guidance unit determines that the conversation is off topic if the conversation has not been concluded before a certain percentage of an amount of time requested for the conversation has elapsed. As another example, preferences can specify certain words and/or phrases (e.g., lunch, football game, television, etc.) that can indicate that the conversation is off topic. The conversation guidance can determine that the conversation is off topic based on detecting usage of the words and/or phrases in the conversation. Additionally, the conversation guidance unit can determine that a conversation is off topic based on a manual indication from a participant. For example, the participant can click a button in an instant messaging window to indicate that another participant is discussing irrelevant topics. Flow continues at block 402.

At block 402, the conversation guidance unit determines which participant has strayed from the topic. For example, the conversation guidance unit determines the participant based on a phrase used by the participant that is considered to be off topic. As another example, a first participant clicks an "off topic" button. So, the conversation guidance unit determines that a second participant has strayed from the topic. Flow continues at block 403.

At block 403, the conversation guidance unit displays a reminder of the topic to the participant and flow ends. For example, the conversation guidance unit causes the topic to flash in the participant's instant messaging window. When a conversation is off track, the conversation guidance unit may remind all participants in the conversation. In addition, the conversation guidance unit may periodically remind the participants of the topic throughout the conversation.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
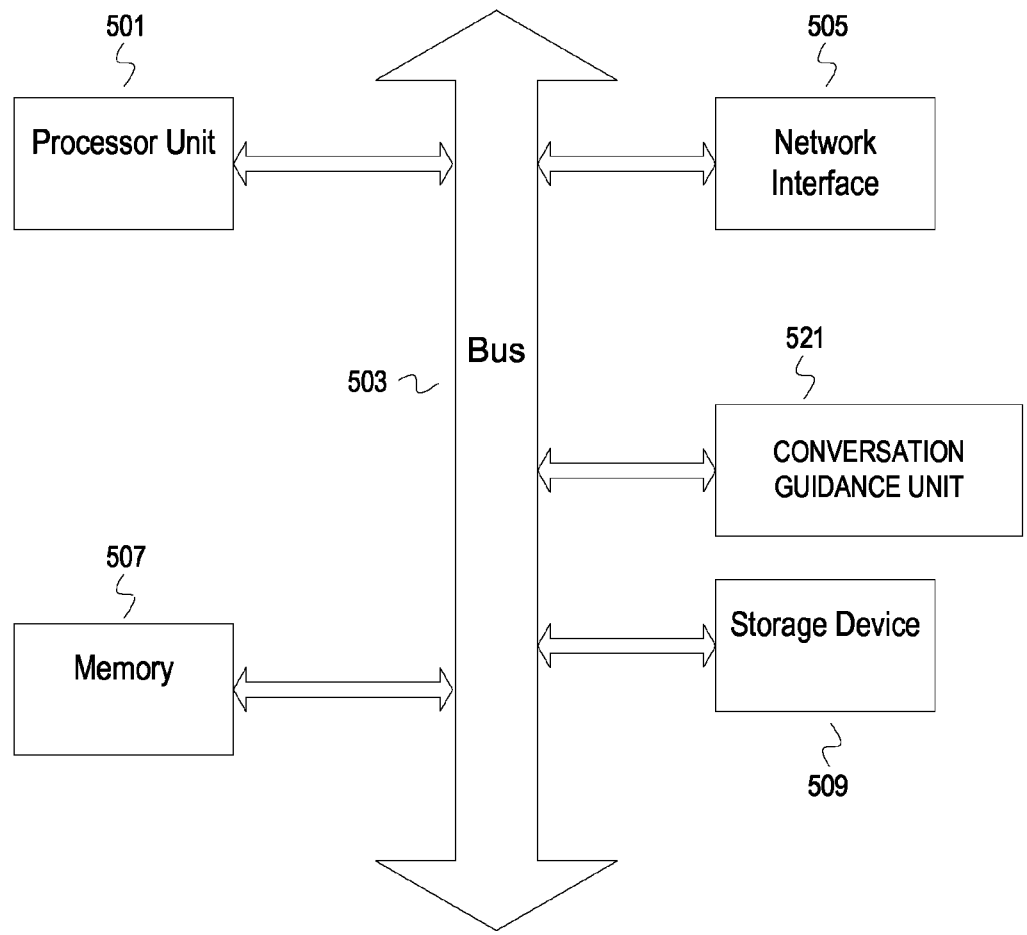
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a conversation guidance unit 521 that determines a topic and an amount of time in response to a conversation request and displays the conversation topic and amount to a recipient of the conversation request. If recipient accepts the conversation, the conversation guidance unit begins the conversation. If the conversation guidance unit determines that the conversation is off track, the conversation guidance unit 521 reminds participants of the topic. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for topic a based guidance for electronic communications as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method comprising:
    detecting, by one or more processors, a request for an electronic conversation, where the request is made by a sender to a recipient and wherein the electronic conversation includes instant messaging in a chat window;
    determining, by one or more processors, that topic based screening is enabled for the recipient of the request for an electronic conversation;
    determining, by one or more processors, based on information provided by the sender, a topic for the electronic conversation;
    displaying the topic to the recipient;
    determining that the recipient accepts the topic wherein the determining, by one or more processors that the recipient accepts the topic includes
        determining based on information provided by the sender, a requested amount of time for the electronic conversation;
        determining, by one or more processors, that the sender accepts the requested amount of time;
    starting the electronic conversation between the recipient and the sender;
    detecting words of the electronic conversation between the recipient and the sender;
    determining, by one or more processors, based on at least one of the words, that at least one of the recipient and the sender has strayed from the topic; and
    presenting a reminder of the topic to the recipient and the sender.

2. The computer-implemented method of claim 1 further comprises:
   determining a time remaining for the electronic conversation, the time remaining based on the requested amount of time and an amount of time elapsed since the electronic conversation started; and
   displaying the time remaining to the sender and the recipient.

3. The computer-implemented method of claim 1, wherein the information provided by the sender comprises, at least one of, text provided by the sender indicating the topic, and a menu selection by the sender indicating the topic.

4. The computer-implemented method of claim 3, further comprising:
   determining a set of topics specified by the recipient;
   determining a status of the recipient; and
   limiting the set of topics to generate the list based on the status.

5. One or more non-transitory computer readable medium including instructions that when executed by a computer cause the computer to perform operations, the instructions comprising:
   instructions to detect a request for an electronic conversation, where the request is made by a sender to a recipient, wherein the electronic conversation includes a text messaging via a chat window;
   instructions to determine that topic based screening is enabled for the recipient of the request for an electronic conversation;
   instructions to determine, based on information provided by the sender, a topic for the electronic conversation;
   instructions to display the topic to the recipient;
   instructions to determine that the recipient accepts the topic, wherein the
      instructions to determine that the recipient accepts the topic include
         instructions to determine, based on information provided by the sender, a requested amount of time for the electronic conversation;
         instructions to determine that the sender accepts the new amount of time;
   instructions to start the electronic conversation between the recipient and the sender;
   instructions to detect words of the electronic conversation between the recipient and the sender;
   instructions to determine, based on at least one of the words, that at least one of the recipient and the sender has strayed from the topic; and
   instructions to presenting a reminder of the topic to the recipient and the sender.

6. The one or more non-transitory computer readable media of claim 5, the instructions further comprising:
   instructions to determine a time remaining based on the requested amount of time and time elapsed since the electronic conversation started; and
   instructions to display the time remaining to the sender and the recipient.

7. The one or more non-transitory computer readable media of claim 5, wherein the information provided by the sender includes one of text indicating the topic and a menu selection indicating the topic.

8. The one or more computer readable media of claim 7 further comprising:
   instructions to determine a set of topics specified by the recipient;
   instructions to determine a status of the recipient; and
   instructions to limit the set of topics based on the status.

9. An apparatus comprising:
   a processing unit;
   a network interface; and
   a conversation guidance unit to,
      detect a request for an electronic conversation, where the request is made by a sender to a recipient, wherein the electronic conversation includes text messages presented via a chat window;
      determine that topic based screening is enabled for the recipient of the request for an electronic conversation;
      determine, based on information provided by the sender, a topic for the electronic conversation;
      display the topic to the recipient;
      determine that the recipient accepts the topic, wherein determination that the recipient accepts the topic includes
         determination, based on information provided by the sender, that a requested amount of time for the electronic conversation;
         determination that the sender accepts the new amount of time;
      start the electronic conversation between the recipient and a sender;
      detect words of the electronic conversation between the recipient and the sender;
      determine, based on at least one of the words, that at least one of the recipient and the sender has strayed from the topic; and
      present a reminder of the topic to the recipient and the sender.

10. The apparatus of claim 9, wherein the conversation guidance unit is further configured to:
    determine a time remaining for the electronic conversation, the time remaining based on the requested amount of time and an amount of time elapsed since the electronic conversation started; and
    display the time remaining to the sender and the recipient.

11. The apparatus of claim 9, wherein the conversation guidance unit being configured to start the electronic conversation between the recipient and the sender comprises the conversation guidance unit being configured to perform at least one of open instant message chat windows and connect a voice call.

12. The apparatus of claim 11, the conversation guidance unit being further configured to:
    determine a set of topics specified by the recipient;
    determine a status of the recipient; and
    limit the set of topics to generate the list based on the status.

* * * * *